Sept. 10, 1929.  M. C. WESTFALL ET AL  1,727,422

DIRECTION INDICATOR SWITCH FOR MOTOR VEHICLES

Filed April 28, 1926

Inventors
MARTIN C. WESTFALL
CHARLES W. KLAUBERG
ROBERT B. FOSTER

Patented Sept. 10, 1929.

1,727,422

UNITED STATES PATENT OFFICE.

MARTIN C. WESTFALL, CHARLES W. KLAUBERG, AND ROBERT B. FOSTER, OF COLUMBUS, OHIO; SAID FOSTER AND SAID KLAUBERG ASSIGNORS TO SAID MARTIN C. WESTFALL.

DIRECTION-INDICATOR SIWTCH FOR MOTOR VEHICLES.

Application filed April 28, 1926. Serial No. 105,106.

The object of this invention is the provision of simple, efficient and easily operated means for exhibiting a signal for the right and left turns of motor vehicles.

In carrying out our invention means are provided at the steering wheel for manually setting a lever to give the desired signal for the turn that is either right or left to be made, the said lever being operated automatically by the turn of the steering wheel to extinguish, remove or stop the signal.

The invention is embodied in the example herein shown and described the features of novelty being finally claimed.

In the accompanying drawing—

Figure 1:
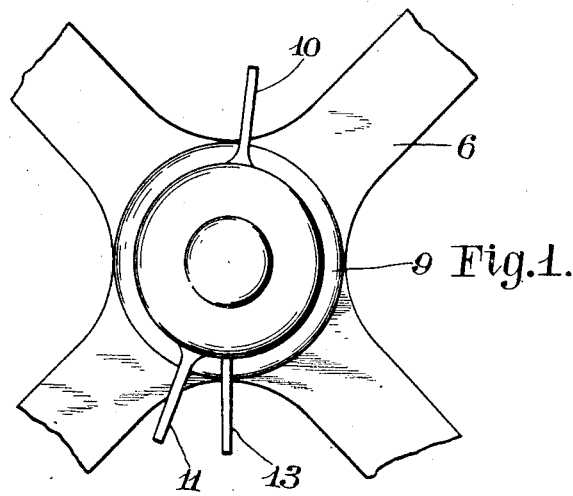
Figure 1 is a top plan view of a fraction of a steering wheel at its hub portion showing our invention applied thereto.
Figure 2:
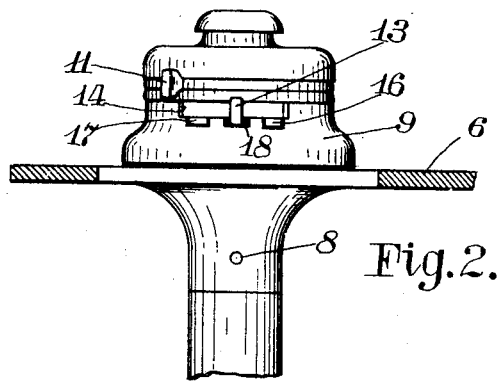
Fig. 2 is an elevation looking upward at Fig. 1.

The steering wheel 6 is of an ordinary variety and is connected with the steering post 7 by a pin 8. The character 9 designates a stationary housing with reference to which the spark control and "gas" levers 10 and 11 respectively are located. In said stationary housing 9 we pivot on a pivot pin at 12 a lever 13 the handle of which extends through a slot 14 so as to be within easy reach of the driver. Said lever 13 can be swung back and forth in said slot and is provided with a suitably electrically insulated contact at 15 that contacts with suitably insulated metallic contacts 16 and 17 in the lower wall of the slot 14. Between the contacts 16 and 17 at the middle of the slot is an insulation 18, so that when the lever lies over that the lighting circuit indicated is open. Such position of the lever can be termed the neutral.

The portion of the lever 13 within the housing is of ovate or arrow head contour its edges from the pivoted end being symmetrical cams and said head is provided with a large opening 13ª through which the steering post 7 extends permitting the head to swing notwithstanding the presence of the steering post.

On the steering post 7 just below the lever 13 is a disc pinned or otherwise secured to the post as at 21. The upper face of the disk 20 near its margin, is provided with a pin 22 located to swing around the rim of the lever head. The disk 20 is secured on the steering post so that the pin 22 stands in a fore and aft line with the pivot pin 12 of the cam member and the steering wheel is in the position for steering the vehicle straight forward. The said ovate cam portion is of such form and dimensions that while in neutral position as shown in Fig. 4 the pin 22 can be passed entirely around it when the steering wheel is turned without impinging or materially moving it; but the dimensions of the cam are such that when the cam member is swung to the right or left to operate a signal the pin 22 by the turning of the steering wheel in the same direction will impinge on the cam edge and throw the cam member to neutral position and thus cut out the signal.

Figures 3, 4, 5:
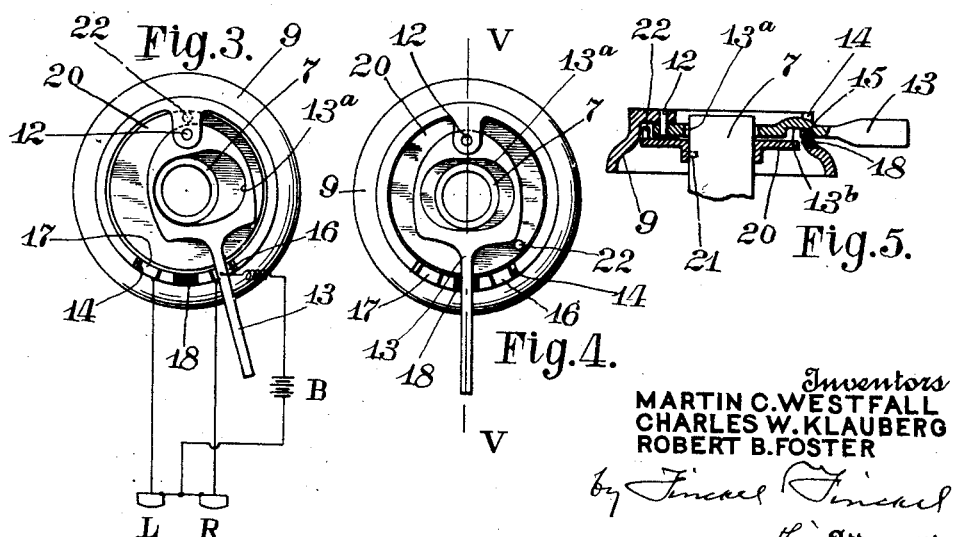
Fig. 3 is a plan view of the top containing the horn button, gas and spark levers removed so as to expose our construction which is added to the equipment. In connection with this view a diagram of a simple wiring is added for indicating how the turn signals may be electrically operated.
Fig. 4 is a view similar to Fig. 3 in which the switching lever is shown in neutral position.
Fig. 5 is a section on the line V—V Fig. 4.

In the diagram of the electric circuit shown in Fig. 3 the characters R and L designate the right and left lamps respectively and B a battery or other suitable source of electrical energy. One side of the battery is connected by wire with the insulated contact of the lever arm where it works over the contacts of the slot 14 while the other is connected with a conductor between the lamps. The lamp R is electrically connected with the right hand contact 16 of the slot 14 while the lamp L is in similar connection with the left hand contact 17 of the slot 14 so that shifting the lever 13 from neutral to one or the other of the contacts 16 and 17 energizes the lamp of the contact to which the lever is shifted.

The wall at each end of the steering post straddling opening 13ª by contact with the steering post limits the swing of the control lever 13 so that the circuit closing contact of that lever shall not pass beyond the contact 16 or 17 to which the lever may be swung.

The notch 13$^b$ in the handle of the cam member permits the steering wheel to be turned through an arc of more than 180 degrees if in any construction to which our invention is applied or circumstances it is possible or necessary to turn it that much.

With our construction it will be observed that the right or left turn signal can be lighted at will and as far as desired in advance of the proposed turn. It is not dependent upon the operation of any other part of the vehicle as for example the clutch lever and it is in convenient reach of the driver. It will also be observed that operating the steering wheel to make the turn effects automatically the extinguishment of the turn signal, and at the same time resets the lever for a further operation.

The forms of the parts can be changed without departing from the gist of the invention as claimed.

What we claim is:

1. A circuit closer for use in connection with a steering means including a steering shaft, means consisting of a single circuit closing lever loosely straddling and surrounding the steering shaft and pivoted on a stationary part and eccentrically as respects the axis of the steering shaft, said lever having substantially symmetrically laterally projecting cams lying at opposite sides of said steering shaft, and means carried by the steering means to operate on one of said cams to shift said lever to a neutral or circuit-opening position when turned either to the right or left.

2. A circuit closer for use in connection with a steering means that includes a steering shaft, said closer including a lever loosely straddling and surrounding the steering shaft and pivoted on a stationary part and eccentrically with respect to the axis of the steering shaft, said lever having substantially symmetrical laterally projecting cams, and means carried by the steering means to operate on either of said cams to shift said lever from a circuit closing position to a neutral or circuit-opening position when the steering means is turned from neutral or straight-ahead steering position, said lever constructed to permit said cam shifting means to pass inertly beyond the cam when the lever is in said neutral position.

3. A circuit closing means for use in connection with a steering means including a steering shaft, said closer including a single circuit closing lever straddling and surrounding the steering shaft whereby the latter acts as a limiting stop, said lever pivoted on a stationary part eccentrically as respects the axis of the steering shaft and having laterally projecting cams lying at opposite sides of said steering shaft, and means carried by the steering means to operate on one of said cams to shift said lever from a circuit closing to a neutral or circuit opening position when turned either to the right or left.

MARTIN C. WESTFALL.
CHARLES W. KLAUBERG.
ROBERT B. FOSTER.